US007314243B2

(12) United States Patent
Okada et al.

(10) Patent No.: US 7,314,243 B2
(45) Date of Patent: Jan. 1, 2008

(54) OPENING AND CLOSING APPARATUS FOR A VEHICLE TRUNK LID

(75) Inventors: Hiroki Okada, Okazaki (JP); Tetsuya Ikeda, Kariya (JP); Akira Matsuhashi, Tokai (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 23 days.

(21) Appl. No.: 11/435,982

(22) Filed: May 18, 2006

(65) Prior Publication Data

US 2006/0261626 A1 Nov. 23, 2006

(30) Foreign Application Priority Data

May 19, 2005 (JP) ............................ 2005-147155

(51) Int. Cl.
*B62D 25/10* (2006.01)

(52) U.S. Cl. .................................... 296/76; 296/146.11

(58) Field of Classification Search .................. 296/76, 296/146.11
See application file for complete search history.

(56) References Cited

U.S. PATENT DOCUMENTS 5,195,796 A * 3/1993 Wampler, II ................. 296/76
6,193,288 B1 * 2/2001 Taga et al. ............. 292/341.16
6,193,300 B1 * 2/2001 Nakatomi et al. ............ 296/76
6,454,339 B2 * 9/2002 Wilde et al. .................. 296/76
6,520,557 B2 * 2/2003 Benthaus et al. ............. 296/76
6,601,903 B2 * 8/2003 Nakagome ................... 296/76
7,243,976 B2 * 7/2007 Okada et al. ............ 296/146.4
2003/0038500 A1 * 2/2003 Aubry et al. ................. 296/76

FOREIGN PATENT DOCUMENTS

JP 2002-201856 A 7/2002
JP 2002-219937 A 8/2002
JP 2002-242532 A 8/2002

* cited by examiner

*Primary Examiner*—Kiran B. Patel
(74) *Attorney, Agent, or Firm*—Buchanan Ingersoll & Rooney PC

(57) ABSTRACT

An opening and closing apparatus for a vehicle trunk lid includes: a hinge arm, one end of which is supported by a vehicle body and an other end of which extends outside from an opening of a trim and is provided with a trunk lid; an adjusting member fixed to the hinge arm inside the trim opening; a torsion bar link, one end of which is supported by the vehicle body and the other end of which is supported by the hinge arm, and the torsion bar link configured to assist the trunk lid to be opened; a first link associated with an output shaft of a driving member so as to rotate with the output shaft; and a second link, one end of which is supported by the first link and an other end of which is supported by the adjusting member.

15 Claims, 7 Drawing Sheets

OPENING AND CLOSING APPARATUS FOR A VEHICLE TRUNK LID

CROSS REFERENCE TO RELATED APPLICATIONS

This application is based on and claims priority under 35 U.S.C. §119 with respect to Japanese Patent Application 2005-147155, filed on May 19, 2005, the entire content of which is incorporated herein by reference.

FIELD OF THE INVENTION

This invention generally relates to an opening and closing apparatus for a vehicle trunk lid.

BACKGROUND

Conventionally, various types of apparatus, which open and close electrically a trunk lid of a vehicle such as an automobile, have been suggested as examples as is disclosed in JP2002-201856A, JP2002-219937A and JP2002-242532A. FIGS. 5, 6 and 7 are side views illustrating an opening and closing mechanism 81 which is included in a trunk lid opening and closing apparatus. More particularly, FIG. 5 is a side view illustrating the opening and closing mechanism 81 under the circumstances that a trunk lid 87 is at a fully closed state. FIG. 6 is a side view illustrating the opening and closing mechanism 81 under the circumstances that the trunk lid 87 is opening or closing. FIG. 7 is a side view illustrating the opening and closing mechanism 81 under the circumstances that the trunk lid 87 is at a fully open state. Those opening and closing mechanisms 81 make a pair at both sides in a vehicle lateral direction. Here, FIGS. 5, 6, and 7 respectively illustrate the opening and closing mechanism 81 mounted at the right side as viewed from the rear, inside of the vehicle. The opening and closing mechanism 81 mounted at the left side possesses substantially the same structure as the right-side one, and the description thereof will be omitted herein.

As is apparent from FIGS. 5, 6 and 7, the opening and closing mechanism 81 incorporates, therein, a hinge arm 82, which is bent and exhibits an approximately U-shaped structure; a torsion bar link 83; a driving unit 84 configured with a motor having for example a speed reducer; a first link 85; and a second link 86.

One end portion 82*a* of the hinge arm 82 is freely rotatably supported by a body of a vehicle (referred to as a vehicle body) 80 via a shaft 91, while the other end portion 82*b* thereof extends outside through an opening portion 80*a* that is formed at a trim (a cover for an inside surface, a wall lining) and is positioned behind the shaft 91, i.e., at the right in FIG. 5. When the trunk lid 87 is at the fully closed state, as illustrated in FIG. 5, the other end portion 82*b* of the hinge arm 82 extends approximately horizontally towards the rear of the vehicle. The trunk lid 87 is securely mounted on the other end portion 82*b* of the hinge arm 82.

As for the torsion bar link 83, one end portion thereof is rotatably supported by the vehicle body 80, while the other end portion thereof is freely rotatably supported by the hinge arm 82 via a shaft 92. The torsion bar link 83 is configured to bias the hinge arm 82 counterclockwise in FIG. 5 and assists the trunk lid 87 to be opened.

The driving unit 84 is supported by the vehicle body 80, and, when it is supplied with an electric current, its output shaft 84*a* rotates clockwise or counterclockwise in FIG. 5. This output shaft 84*a* is positioned below the shaft 91. One end portion of the first link 85 is connected to the output shaft 84*a* so as to rotate integrally therewith.

The other end portion of the first link 85 is freely rotatably supported by one end portion of the second link 86 via a shaft 93. The other end portion of the second link 86 is freely rotatably supported by the hinge arm 82 via a shaft 94. The shaft 92 is positioned at an approximately intermediate portion between the shafts 91 and 94 on the hinge arm 82.

As described above, a four-link mechanism is configured with the hinge arm 82, the first link 85, the second link 86 and the vehicle body 80. Therefore, in response to an operation of the four-link mechanism implemented by activating the driving unit 84 (the output shaft 84*a*) to rotate, the hinge arm 82 is operated back and forth via the first and second links 85 and 86, and the trunk lid 87 provided at the other end portion 82*b* of the hinge arm 82 is opened and closed.

In the opening and closing mechanism 81 with the above-described structure, a reference L1 denotes a length from the output shaft 84*a* relative to a line of action l1 extending on the shafts 93 and 94, while a reference L2 denotes a length from the output shaft 91 relative to the line of action l1. In such circumstances, a relationship between a torque T1 about a pivot point of the shaft 91 of the hinge arm 82 and a torque T2 about a pivot point of the output shaft 84*a* is expressed by the following equation with a link ratio of L2/L1;

$$T1=(L2/L1)\cdot T2.$$

Therefore, a torque T1 is increased when the hinge arm 82 is pushed at a portion that is distant from the shaft 91. However, in the perspective of improving the appearance of the trunk lid 87 or of the rear appearance of the vehicle, the joint position of the second link 86 to the hinge arm 82 (via the shaft 94) is determined so as not to outstand the second link 86 outside from the opening portion 80*a* of the trim even when the trunk lid 87 is at the fully open state (FIG. 7).

While the trunk lid 87 is being operated to open or close, the output shaft 84*a* is on occasions located on the straight-line l2 extending between the shaft 91 and the shaft 94. In such circumstances, an angle θ, which is formed by the first and second links 85 and 86 within an operation range of the trunk lid 87 to be opened or closed, reaches a minimum, and the link ratio of L2/L1 reaches a maximum. The torque T1 hence reaches a maximum. The angle θ is, in other words, formed by a straight-line l3 and the straight-line l1 both diverging from the shaft 93. The straight-line l3 connects the shaft 93 to the output shaft 84*a*. Meanwhile, because a degree of force, which is required to operate the trunk lid 87, reaches a maximum when the trunk lid 87 is to be completely closed, the output shaft 84*a* is positioned within a space where the output shaft 84*a* can be mounted, so as to be closest to the straight-line 12 extending between the shafts 91 and 94 when the trunk lid 87 is at the fully closed state as illustrated in FIG. 5. FIG. 5 illustrates an angle θ1 formed by the first and second links 85 and 86 when the trunk lid 87 is at the fully closed state.

Further, in order to block the torsion bar link 83 and the second link 86 from interfering with each other, the lengths of the first and second links 85 and 86 are determined in such a manner that the first link 85 measures a predetermined length or more.

Furthermore, the link ratio of L2/L1 is increased in response to decrease in the angle θ formed by the first and second links 85 and 86. The torque T1 is hence increased. However, in order to avoid turnover (a reversal of a force acting direction) of the first and second links 85 and 86 due to dimensional differences, deflections due to high-load applied thereto, and so on it is preferable that the minimum angle θ2 (FIG. 6) which is formed by the first and second links 85 and 86 within the operation range, be 30 degrees or greater than that.

Likewise, in order to avoid turnover (a reversal of a force acting direction) of the first and second links 85 and 86 due to dimensional differences, deflections due to high-load applied thereto, and so on it is preferable that the maximum angle θ3 (FIG. 7) which is formed by the first and second links 85 and 86 within the operation range, be 140 degrees or less than that.

Depending on types of vehicles, in evaluating the positions of these members by the above-described modes, as far as the known hinge arm 82 is employed, the minimum angle θ2, which is formed by the first and second links 85 and 86, may not on occasions be able to be controlled at 30 degrees or greater than that. In this case, although the minimum angle θ2 can be increased with the first link 85 shortened for example, it may result in interference between the torsion bar link 83 and the second link 86.

As an alternative, if the position of the shaft 94 is shifted to the side of a tip end of the hinge arm 82 (i.e., to the side of the other tip end 82*b*), the minimum angle θ2 can be increased. However, when the trunk lid 87 is completely opened or is maintained at the fully open state, it may cause the second link 86 to appear outside through the opening portion 80*a* of the trim, which may undesirably damage the appearance of the trunk lid 87 or the rear appearance of the vehicle.

As another alternative, if the speed reduction ratio of the driving unit 84 is lowered with a reduced outer diameter of a gear 84*b*, the minimum angle θ2 can be increased by shifting the position of the output shaft 84*a* upward (upward in FIG. 6) at a shifting amount corresponding to the reduced amount of the outer diameter of the gear 84*b*. However, in this case, the output of the driving unit 84 is lowered.

In order to assure the minimum angle θ2 at 30 degrees or more, sill another alternative would be to develop or newly create a hinge arm, which possess a different shape in substitution for the known hinge arm 82. However, because this may cause an extra load for a design change and may reduce a versatility of components, this idea is less realistic.

The present invention has been made in view of the above circumstances, and provides an opening and closing apparatus for a vehicle trunk lid, the apparatus which can at least open or close a trunk lid by using a known hinge arm, can reduce a load of design change and can assure the minimum angle formed by first and second links at an appropriate degree.

SUMMARY OF THE INVENTION

According to an aspect of the present invention, an opening and closing apparatus for a vehicle trunk lid includes: a hinge arm, one end of which is freely rotatably supported by a body of a vehicle and an other end of which extends outside from an opening of a trim and is fixedly provided with a trunk lid; an adjusting member fixedly attached to the hinge arm inside of the opening of the trim; a torsion bar link, one end of which is freely rotatably supported by the vehicle body and an other end of which is freely rotatably supported by the hinge arm, and the torsion bar link configured to assist the trunk lid to be opened; a driving member supported by the vehicle body and including an output shaft activated to be rotated; a first link associated with the output shaft so as to rotate integrally with the output shaft; and a second link, one end of which is freely rotatably supported by the first link and an other end of which is freely rotatably supported by the adjusting member.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention is described herein with reference to FIGS. 1, 2, 3 and 4.

Figure 4:
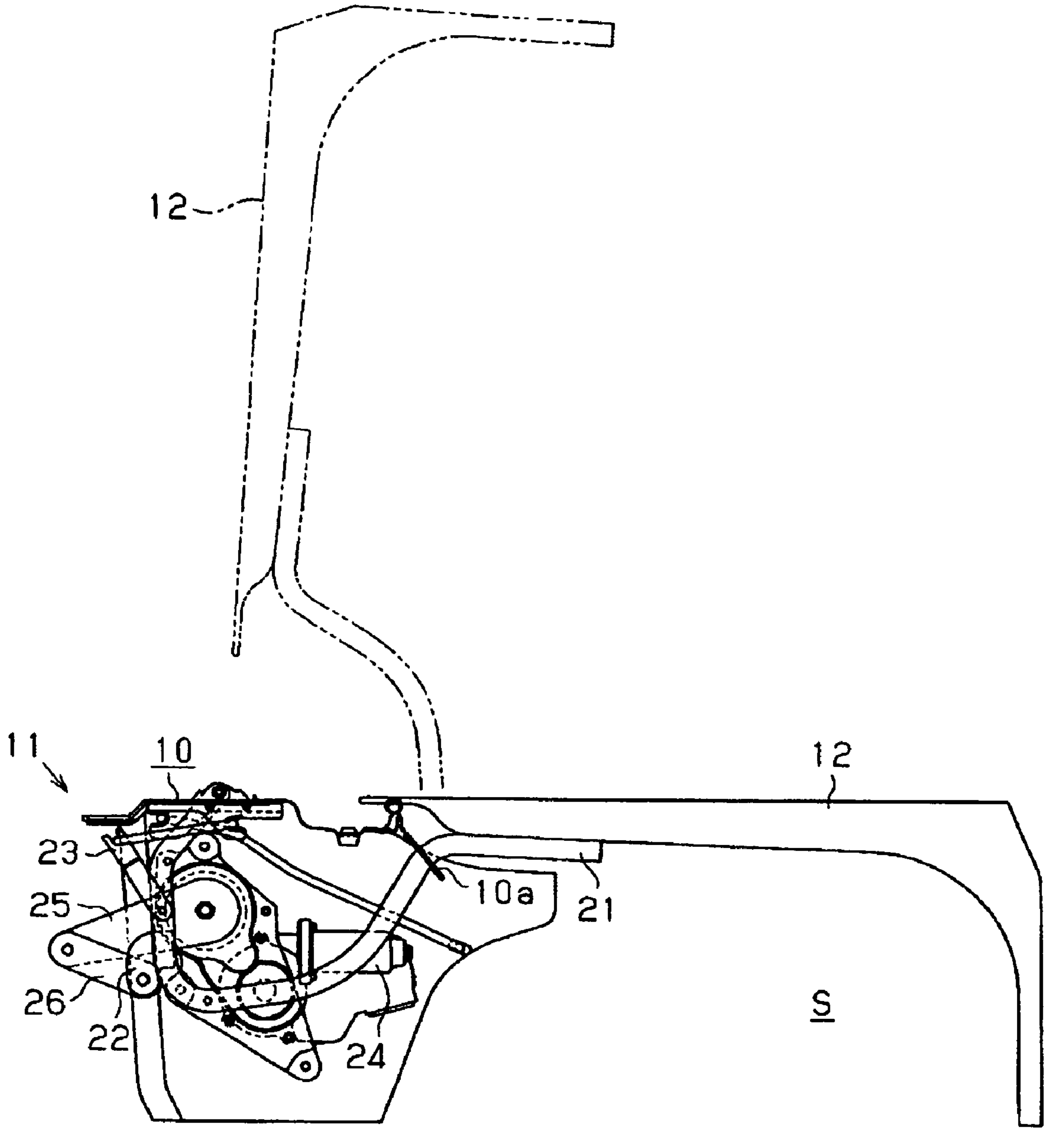
FIG. 4 is a side view illustrating a rear portion of a vehicle such as an automobile according to an embodiment of the present invention.
Figure 5:
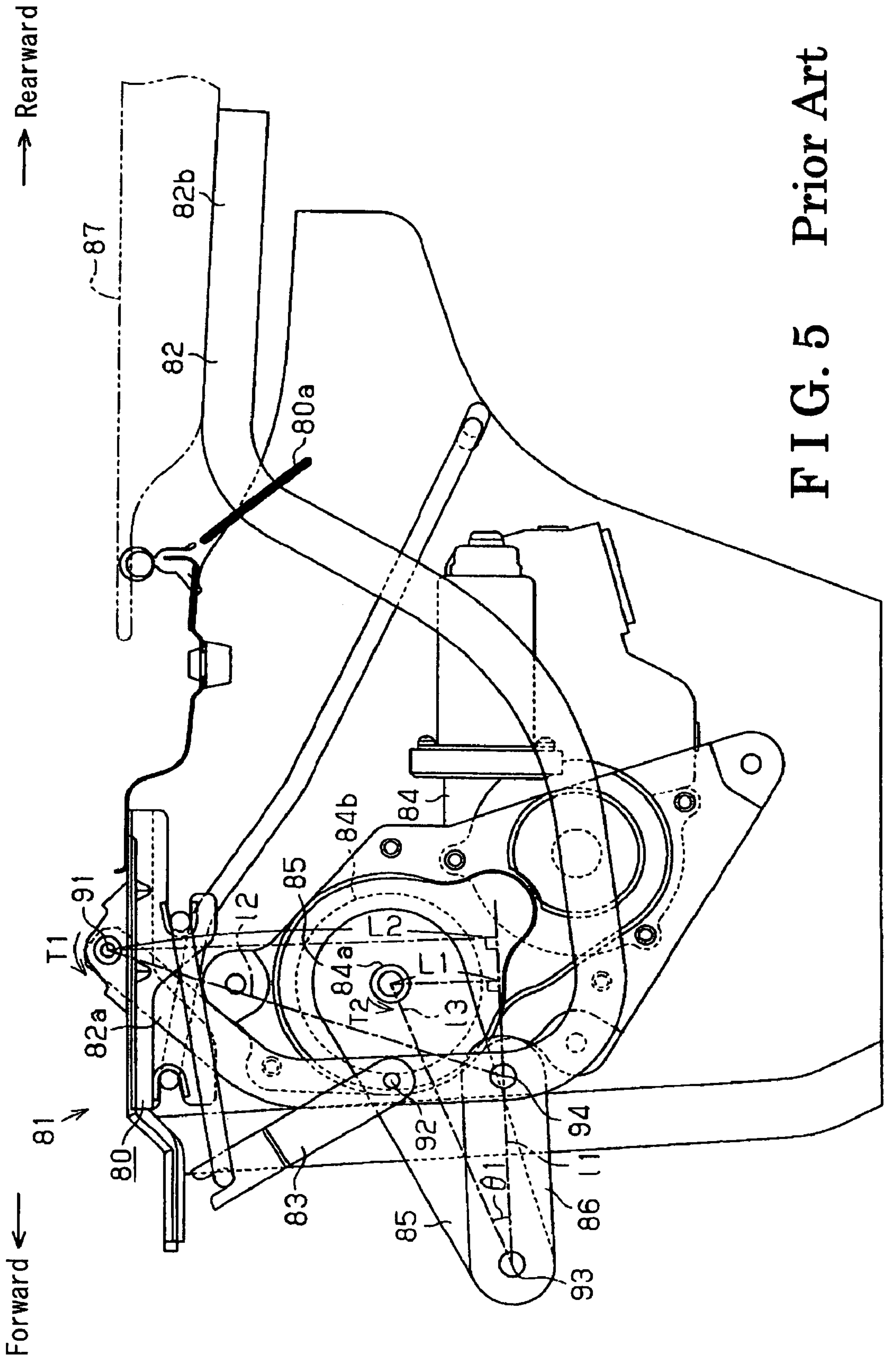
FIG. 5 Prior Art
FIG. 5 is a side view illustrating a conventional opening and closing mechanism of a trunk lid under the circumstances that the trunk lid is at a fully closed state.
Figure 6:
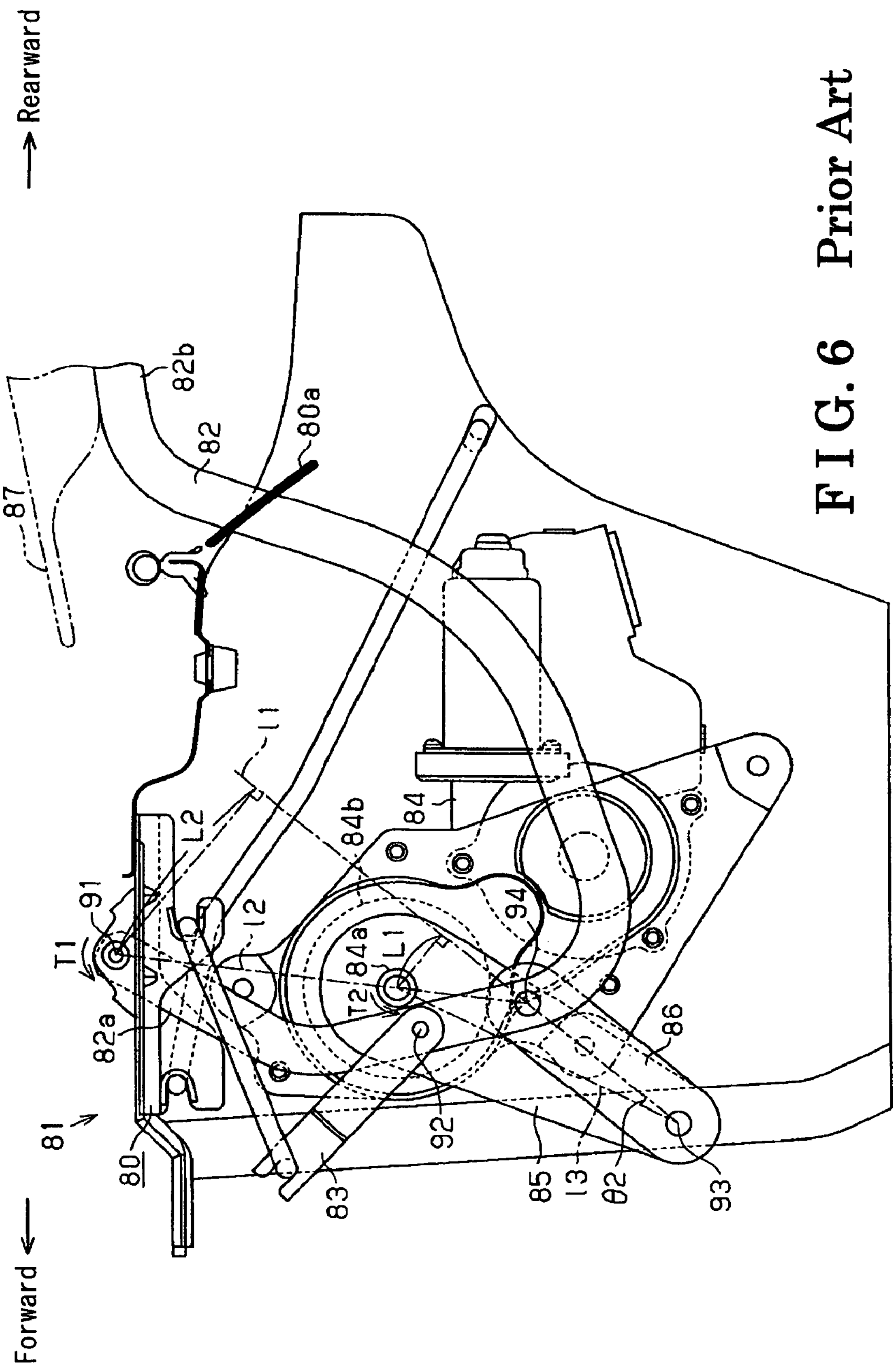
FIG. 6 Prior Art
FIG. 6 is a side view illustrating the conventional opening and closing mechanism of the trunk lid under the circumstances that the trunk lid is opening or closing.
Figure 7:
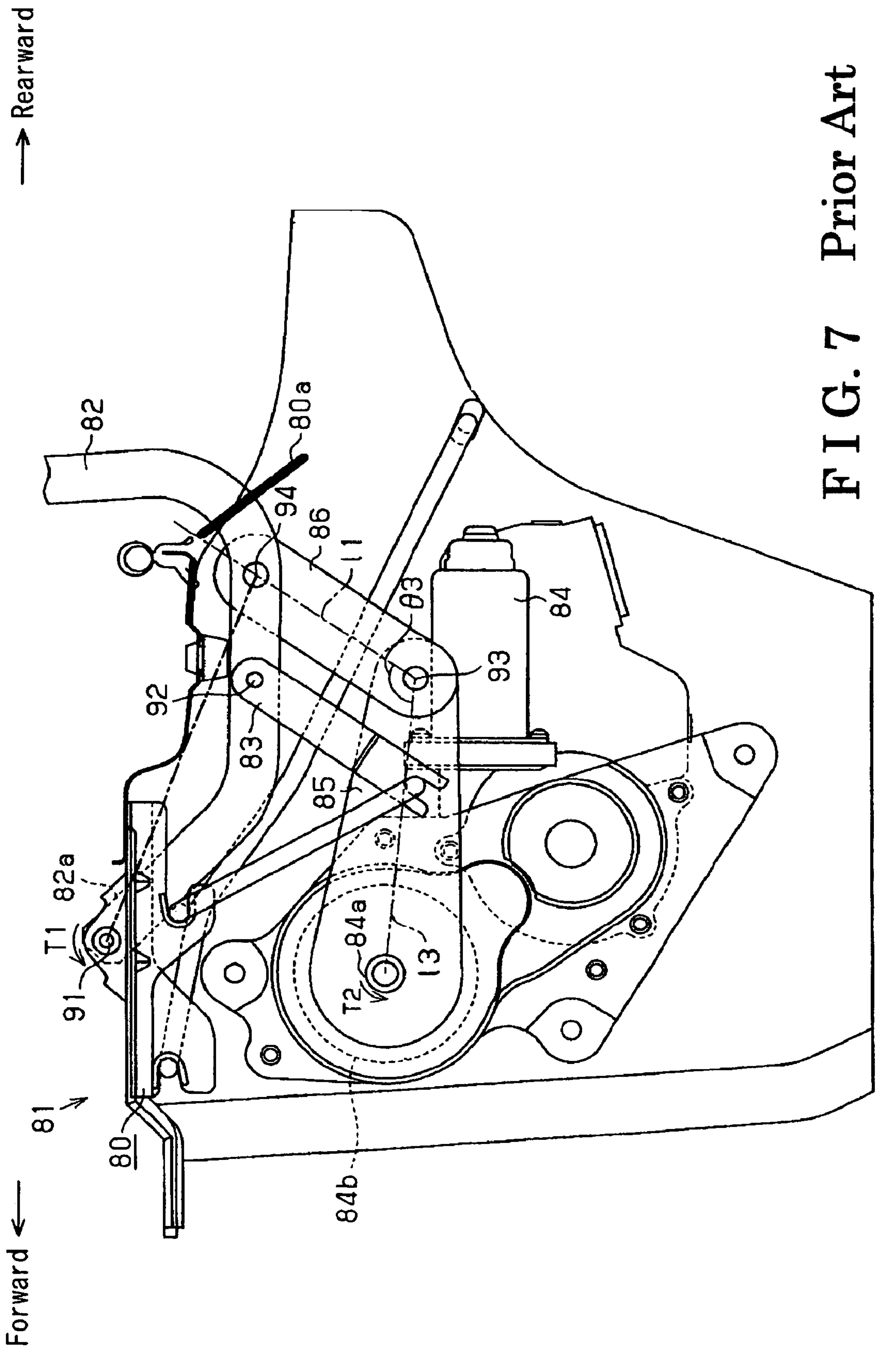
FIG. 7 Prior Art
FIG. 7 is a side view illustrating the conventional opening and closing mechanism of the trunk lid under the circumstances that the trunk lid is at a fully open state.

As illustrated in FIG. 4, a body 10 of a vehicle (hereinafter, referred to as a vehicle body 10) is secured with an opening and closing mechanism 11 that at least opens and closes a trunk lid 12. The opening and closing mechanism 11 can keep the trunk lid 12 halfway between a fully open position and a fully closed position. The opening and closing mechanisms 11 can make a pair at both sides in a vehicle lateral direction. Alternatively, the opening and closing mechanism 11 can be provided at either the right or left side as viewed from the rear of the vehicle. Here, FIG. 4 illustrates the opening and closing mechanism 11 mounted at the right side, as seen from the rear, inside of the vehicle. The opening and closing mechanism 11 mounted at the left side possesses substantially the same structure as the right-side one, and the description thereof will be omitted herein.

The opening and closing mechanism 11 supports the trunk lid 12 in the method described below. This trunk lid 12 is at least opened or closed by an operation of the opening and closing mechanism 11. When the trunk lid 12 is opened or tilted up by the operation of the opening and closing mechanism 11, a luggage space S, which is defined below the trunk lid 12, is opened. Likewise, when the trunk lid 12 is closed or tilted down by the operation of the opening and closing mechanism 11, the luggage space S is closed or is covered with the trunk lid 12.

Described below is the opening and closing mechanism 11 with reference to FIGS. 1, 2 and 3.

Figure 1:
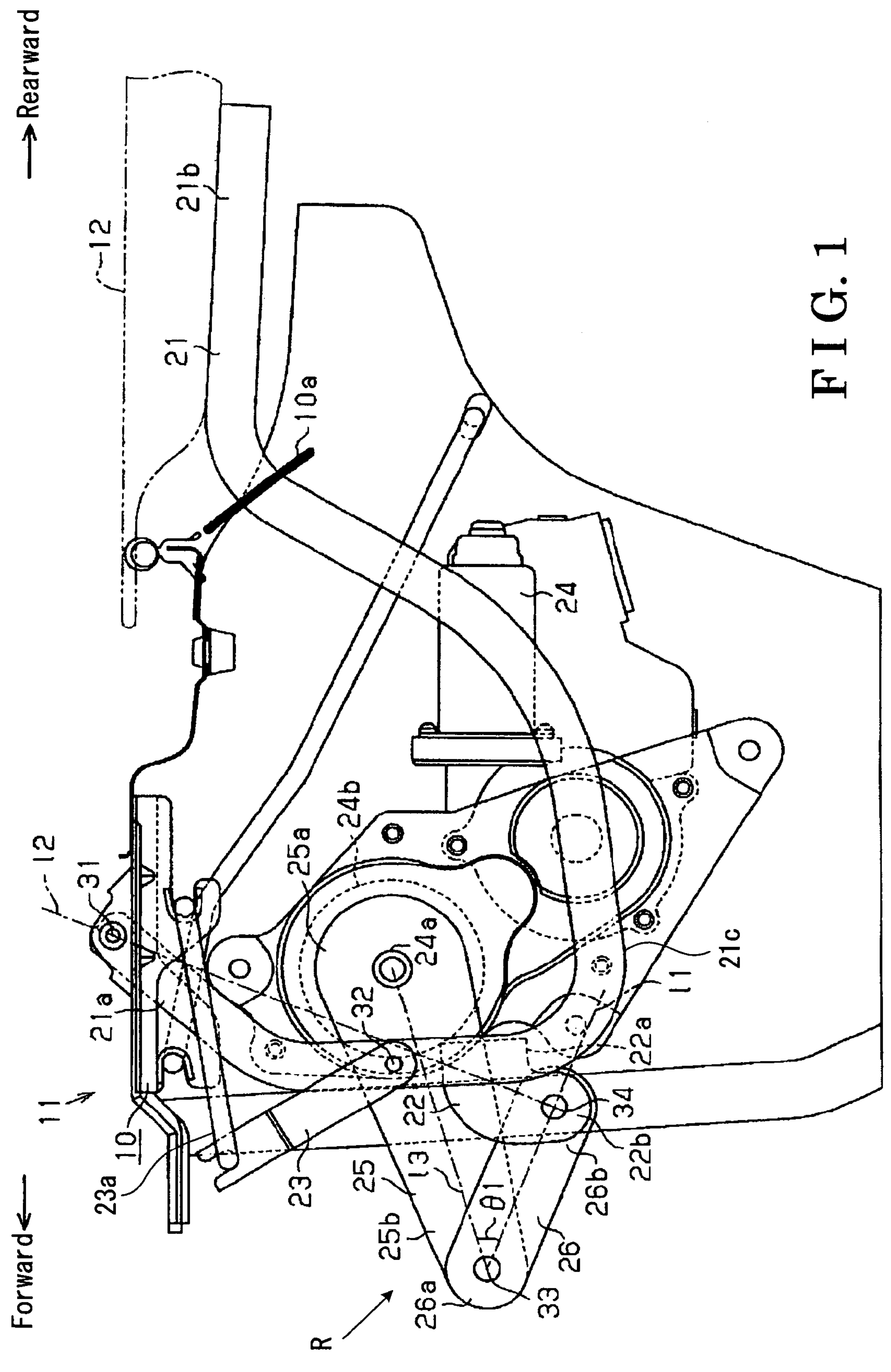
FIG. 1 is a side view illustrating an opening and closing mechanism of a trunk lid under the circumstances that the trunk lid is at a fully closed state according to an embodiment of the present invention.
Figure 2:
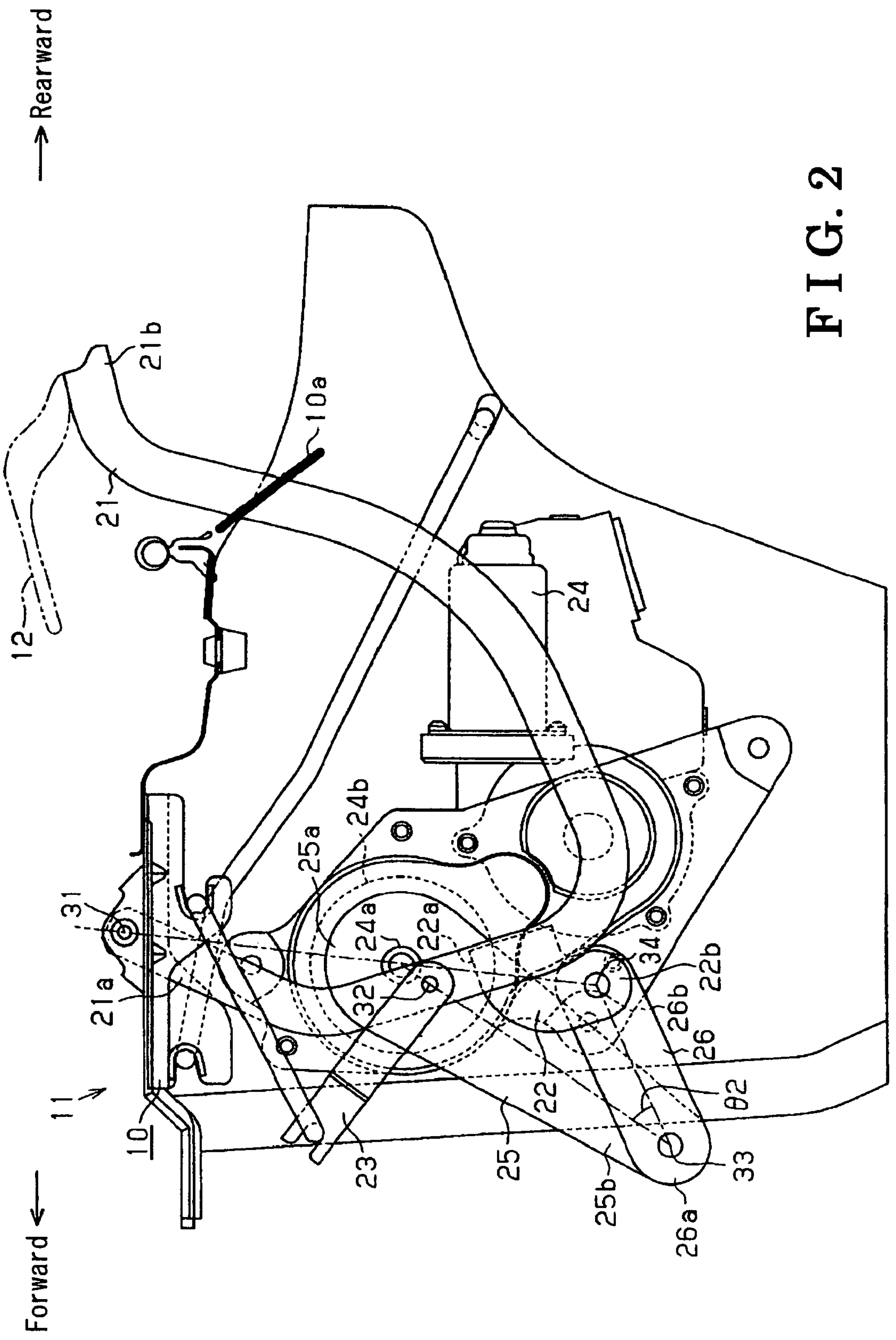
FIG. 2 is a side view illustrating the opening and closing mechanism of the trunk lid under the circumstances that the trunk lid is opening or closing.
Figure 3:
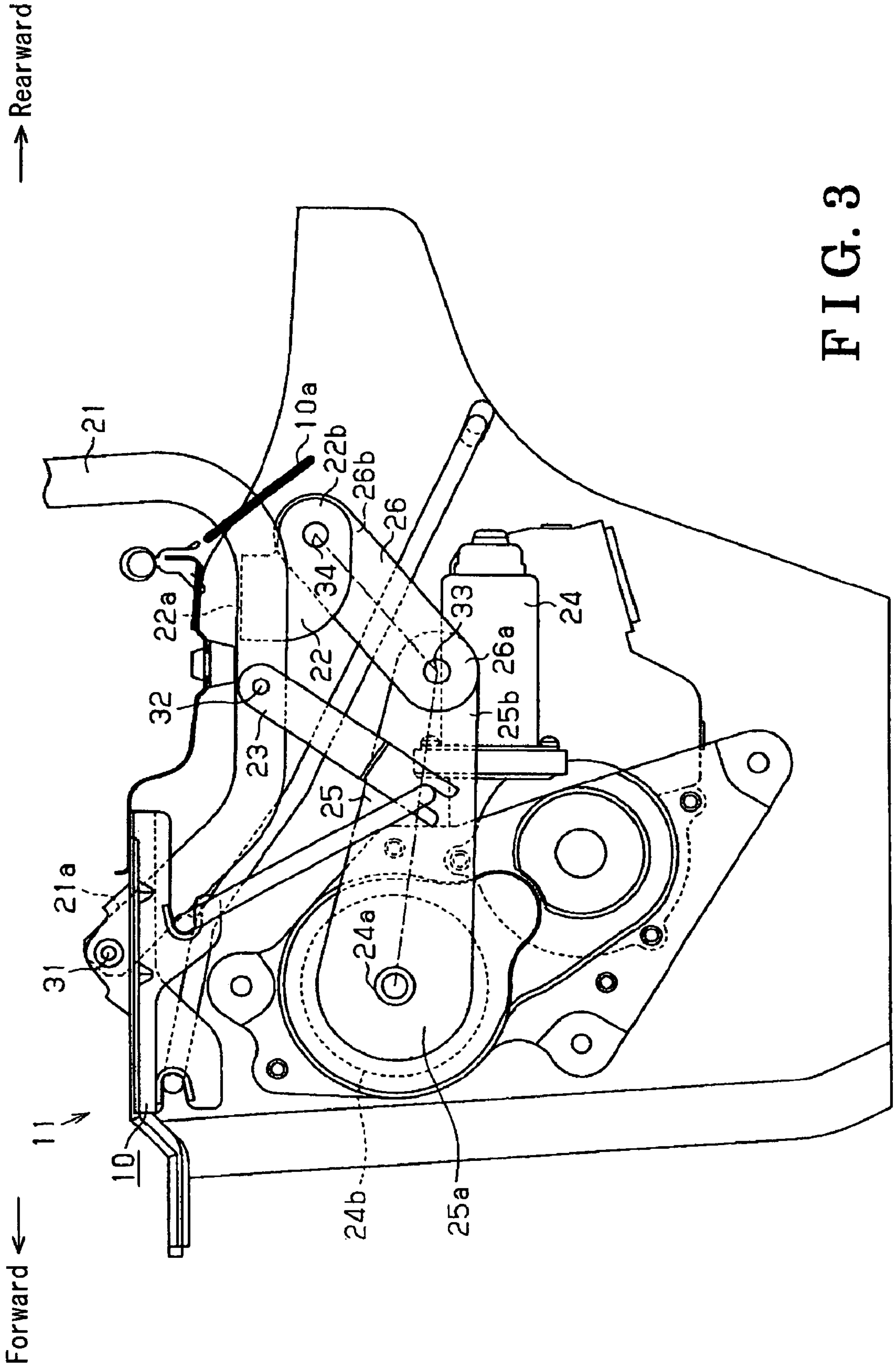
FIG. 3 is a side view illustrating the opening and closing mechanism of the trunk lid under the circumstances that the trunk lid is at a fully open state.

As illustrated in FIGS. 1, 2 and 3, the opening and closing mechanism 11 includes: a hinge arm 21, which is formed by bending an approximately square or rectangular cross-sectional bar to exhibit an approximately U-shaped structure; an adjusting member 22; a torsion bar link 23; a driving unit 24 configured with a motor having for example a speed reducer; a first link 25; and a second link 26.

One end portion 21*a* (an end portion at the side of the front portion of the vehicle) of the hinge arm 21 is freely rotatably supported by the vehicle body 10 via a shaft 31, while the other end portion 21*b* (an end portion at the side of the rear portion of the vehicle) thereof extends outside through an opening portion 10*a*, which serves as a trim opening portion formed at a trim (a cover for an inside surface, a wall lining) provided inside the luggage space S and is positioned behind the shaft 31, i.e., at the right in FIG. 1. When the trunk lid 12 is at the fully closed state, as illustrated in FIG. 1, the other end portion 21*b* of the hinge arm 21 extends approximately horizontally towards the rear of the vehicle. The trunk lid 12 is mounted on and secured to the other end portion 21*b* of the hinge arm 21. Therefore, when the hinge arm 21 rotates counterclockwise, i.e., in a first direction, about the shaft 31, the trunk lid 12 is opened or tilted up. On the other hand, when the hinge arm 21 rotates clockwise, i.e., in a second direction, about the shaft 31, the trunk lid 12 is closed or tilted down. The shape or figure (the approximately U-shape) of the hinge arm 21 is designed in such a manner that the hinge arm 21 can appear outside through the opening portion 10*a* within a rotational range about the shaft 31 associated with the opening/closing operation of the trunk lid 12 and without being interfered with the opening portion 10*a*. The aforementioned hinge arm 21 can rotate in the same manner when the trunk lid 21 is opened and closed manually as well as when the trunk lid 21 is opened and closed automatically as described above.

The adjusting member 22 is formed or molded with a metal plate to exhibit an approximately L-shaped structure. One end portion 22*a* of the adjusting member 22 is fixedly attached to the hinge arm 21, for example by means of welding. The adjusting member 22 is shaped in such a manner that, when the trunk lid 12 is at the fully open position as illustrated in FIG. 3, the one end portion 22*a* (a jointed position with the hinge arm 21) recedes further towards the inside (to the left in FIG. 3) from the opening portion 10*a* than the other end portion 22*b* (a portion at which the adjusting member 22 operatively supports the other end portion of the second link 26) does. The adjusting member 22 is operatively connected to a link unit R connected to the driving unit 24. The link unit R includes: the first link 25 connected to the driving unit 24; and the second link 26, one end portion 26*a* of which is connected to the first link 25 and the other end portion 26*b* of which is connected to the adjusting member 22. When the trunk lid 12 is at the fully closed state as illustrated in FIG. 1, the adjusting member 22 overlaps the first link 25 and the second link 26 in the lateral direction of the vehicle and do not interfere therewith. Accordingly, the first and second links 25 and 26 can be housed in a reduced space. When the trunk lid 12 is at the fully closed state, the adjusting member 22 and the second link 26 do not project downward from a lowermost portion 21*c* of the hinge arm 21. Accordingly, it is possible to reduce a size or length of the opening and closing apparatus of the trunk lid in a vehicle vertical direction (in an up-and-down direction in FIG. 1).

As for the torsion bar link 23, one end portion thereof is supported by a vehicle-side link 23*a* to be freely rotatable relative to the vehicle body 10, while the other end portion thereof is freely rotatably supported by the hinge arm 21 via a shaft 31. The shaft 32 is positioned at an approximately intermediate between the one end portion 22*a* and the shaft 31 on the hinge arm 21. The torsion bar link 23 is configured to bias the hinge arm 21 counterclockwise in FIG. 1 and assists the trunk lid 12 to be opened.

The driving unit 24 is supported by the vehicle body 10, and, when it is supplied with an electric current, its output shaft 24*a* rotates via a gear 24*b* configuring a speed reducer, clockwise or counterclockwise in FIG. 1. This output shaft 24*a* is positioned below the shaft 31. The end portion 25*a* of the first link 25 is connected to the output shaft 24*a* so as to rotate integrally therewith.

The other end portion 25*b* of the first link 25 is freely rotatably supported by the one end portion 26*a* of the second link 26 via a shaft 33. The other end portion 26*b* of the second link 26 is freely rotatably supported by the other end portion 22*b* of the adjusting member 22 via a shaft 34. In order to block the torsion bar link 23 and the second link 26 from interfering with each other, the lengths of the first and second links 25 and 26 are determined in such a manner that the first link 25 measures a predetermined length or more.

As described above, a four-member rotational linkage (a four-link mechanism) is configured with the hinge arm 21 fixed with the adjusting member 22; the first link 25; the second link 26; and the vehicle body 10. Therefore, in response to an operation of the four-link mechanism implemented by activating the driving unit 24 (the output shaft 24*a*) to rotate, the adjusting member 22 is operated back and forth (the right-and-left direction in FIG. 1) via the first and second links 25 and 26, and the trunk lid 12, which is provided at the other end portion 21*b* of the hinge arm 21 fixed with the adjusting member 22, is opened and closed. As for this four-link mechanism, the other end portion 26*b* of the second link 26 is supported by the hinge arm 21 via the adjusting member 22. In other words, a position of a pivot point of the other end portion 26*b* of the second link 26 (the shaft 34) relative to the hinge arm 21 can be adjusted by use of the adjusting member 22.

As is apparent from FIG. 1, a reference 11 is a straight-line connecting the both end portions of the second link 26 (the shafts 33 and 34), a reference 12 is a straight-line connecting the shaft 31 and the shaft 34, and a reference 13 is a straight-line connecting the output shaft 24*a* and the shaft 33. In order to control an output of the output shaft 24*a* at the maximum level when the trunk lid 12 is completely closed, the output shaft 24*a* is determined to position itself so as to be closest to the straight-line l2 when the trunk lid 12 is at the fully closed state within a range where the output shaft 24*a* can be mounted. FIG. 1 illustrates an angle θ1 which is formed by the first and second links 25 and 26, in other words, which is formed by the straight-lines 11 and 13 diverging from the shaft 33.

While the trunk lid 12 is being operated to open or close (tilt up or down), the output shaft 24*a* is on occasions located on the straight-line l2 extending between the shafts 31 and 34, as illustrated in FIG. 2. In such circumstances, an angle θ, which is formed by the first and second links 25 and 26 within an operation range of the trunk lid 12 to be opened or closed, reaches a minimum. As is obvious from FIG. 2, according to the embodiment of the present invention, the minimum angle θ2 formed by the first and second links 25 and 26 can be controlled at 30 degrees or greater than that by implementing the aforementioned adjustment with the adjusting member 22. As illustrated in FIG. 3, the maximum angle θ3, which is formed by the first and second links 25 and 26 within the operation range, is controlled at 140 degrees or less.

As described above, at least the following explanations will be obtained according to the embodiment of the present invention.

(1) According to the embodiment of the present invention, the other end portion 26*b* of the second link 26 is supported by the hinge arm 21 via the adjusting member 22. Therefore, even if the existing hinge arm 21 is employed, the minimum angle θ2 formed by the first and second links 25 and 26 can be assured at an appropriate level (30 degrees or more) by adjusting a position of the shaft 34, i.e., a position at which the other end portion 26*b* of the second link 26 is supported by the adjusting member 22. In this case, it is possible to avoid the second link 26 to project outside through the opening portion 10*a*. Moreover, it is possible not to incur turnover (a reversal of a force acting direction) of the first and second links 25 and 26 due to dimensional differences, deflections due to high-load applied thereto, and so on.

(2) The adjusting member 22 is formed or molded in such a manner that, when the trunk lid 12 is completely open or at the fully open state, the jointed portion of the adjusting member 22 with the hinge arm 21, i.e., the other end portion 22*a*, recedes further towards the inside from the opening portion 10*a* than the position (the shaft 34), at which the other end portion 26*b* of the second link 26 is supported by the adjusting member 22, does. Therefore, by arranging the position, at which the other end portion 26*b* of the second link 26 is supported by the adjusting member 22, inside from the opening portion 10*a*, it is possible to prevent the adjusting member 22 from projecting outside through the opening portion 10*a*.

(3) According to the embodiment of the present invention, the adjusting member 22 can be formed or molded so as to possess a distinctly simple and approximately L-shaped structure.

(4) According to the embodiment of the present invention, it is possible to employ the first link 25 having a sufficient length according to which interference between the torsion bar link 23 and the second link 26 can be prevented.

(5) According to the embodiment of the present invention, when the trunk lid 12 is completely opened or at the fully open state, the adjusting member 22 and the second link 26 can be prevented from projecting outside through the opening portion 10*a*. Therefore, it is possible to improve an appearance of the trunk lid 12 or a rear appearance of the vehicle.

(6) According to the embodiment of the present invention, there is no need to reduce the gear 24*b* in size. Therefore, it is possible to avoid reduction of an output of the driving unit 24, which incurs due to declining of a speed reduction ratio.

(7) According to the embodiment of the present invention, the maximum angle θ3 of the first and second links 25 and 26 can be controlled at 140 degrees or less. Therefore, it is possible to avoid turnover (a reversal of a force acting direction) of the first and second links 25 and 26 due to dimensional differences, deflections due to high-load applied thereto, and so on.

(8) According to the embodiment of the present invention, the adjusting member 22 can be fixed to the hinge arm 21 by means of welding for example. In such case, there is no need to directly bore the hinge arm 21 for a jointing bore, which leads to an increase in its robustness.

Alternative would be to fix the adjusting member 22 to the hinge arm 21 by use of bolts and nuts.

Still alternatively, the shape of the adjusting member 22 is not limited to the above as far as the adjusting member 22 does not project outside through the opening portion 10*a*.

Still alternatively, the maximum angle θ3 at 140 degrees or more is one of the examples, and the maximum angle θ3 is not limited to the above.

As described above, a four-member rotational linkage (a four-link mechanism) is configured with the hinge arm fixed with the adjusting member; the first link; the second link; and the vehicle body. Therefore, in response to an operation of the four-link mechanism implemented by activating the driving unit (the output shaft) to rotate, the adjusting member is operated back and forth via the first and second links, and the trunk lid, which is provided at the other end portion of the hinge arm fixed with the adjusting member, is opened and closed. As for this four-link mechanism, the other end portion of the second link is supported by the hinge arm via the adjusting member. In other words, a position of a pivot point of the other end portion of the second link (the shaft) relative to the hinge arm can be adjusted by use of the adjusting member. Therefore, even if the existing hinge arm is employed, the minimum angle formed by the first and second links can be assured at an appropriate degree by adjusting a position at which the other end portion of the second link is supported by the adjusting member, i.e., by adjusting a pivot axis of the other end portion of the second link relative to the adjusting member.

The principles, the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. An opening and closing apparatus for a vehicle trunk lid comprising:
- a hinge arm, one end of which is freely rotatably supported by a body of a vehicle and an other end of which extends outside from an opening of a trim and is fixedly provided with a trunk lid;
  - an adjusting member fixedly attached to the hinge arm inside of the opening of the trim;
- a torsion bar link, one end of which is freely rotatably supported by the vehicle body and an other end of which is freely rotatably supported by the hinge arm, and the torsion bar link configured to assist the trunk lid to be opened;
- a driving member supported by the vehicle body and including an output shaft activated to be rotated;
  - a first link associated with the output shaft so as to rotate integrally with the output shaft; and
  - a second link, one end of which is freely rotatably supported by the first link and an other end of which is freely rotatably supported by the adjusting member.

2. An opening and closing apparatus for a vehicle trunk lid according to claim 1, wherein, the adjusting member is bent in such a manner that, when the vehicle trunk lid is at a fully open state, a joined portion between the adjusting member and the hinge arm recedes further towards the inside from the opening of the trim than a portion at which the adjusting member operatively supports an other end portion of the second link does.

3. An opening and closing apparatus for a vehicle trunk lid according to claim 2, wherein the adjusting member exhibits an L-shaped structure.

4. An opening and closing apparatus for a vehicle trunk lid according to claim 1, wherein, when the trunk lid is at a fully closed state, the adjusting member overlaps the first link and the second link without being interfered with the first link and the second link.

5. An opening and closing apparatus for a vehicle trunk lid according to claim 1, wherein, the adjusting member and the second link are arranged so as to position above a lowermost end of the hinge arm in a vertical direction of the vehicle body when the trunk lid is at the fully closed state.

6. An opening and closing apparatus for a vehicle trunk lid according to claim 1, wherein the second link does not interfere with the torsion bar link.

7. An opening and closing apparatus for a vehicle trunk lid according to claim 1, wherein a minimum angle that is formed by the first link and the second link is degrees or greater than that.

8. An opening and closing apparatus for a vehicle trunk lid according to claim 1, wherein a maximum angle that is formed by the first link and the second link is 140 degrees or smaller than that.

9. An opening and closing apparatus for a vehicle trunk lid according to claim 1, wherein a position of the adjusting member relative to the hinge arm is adjusted by adjusting a position of the other end portion of the second link.

10. An opening and closing apparatus for a vehicle trunk lid according to claim 1, wherein the adjusting member is always inside of the opening of the trim.

11. An opening and closing apparatus for a vehicle trunk lid according to claim 1, wherein the adjusting member prevents a turnover of the first link and the second link.

12. An opening and closing apparatus for a vehicle trunk lid according to claim 1, wherein the adjusting member, the driving member, the first link and the second link are provided at one side of the vehicle body in a lateral direction of the vehicle body.

13. An opening and closing apparatus for a vehicle trunk lid according to claim 1, wherein the adjusting member, the driving member, the first link and the second link are provided at both respective sides of the vehicle body in a lateral direction of the vehicle body.

14. An opening and closing apparatus for a vehicle trunk lid according to claim 1, wherein the driving member includes a speed reducer.

15. An opening and closing apparatus for a vehicle trunk lid according to claim 1, wherein the vehicle body, the hinge arm, the first link and the second link configures a four-link mechanism.

* * * * *